United States Patent
Dasgupta et al.

(10) Patent No.: US 9,503,359 B2
(45) Date of Patent: Nov. 22, 2016

(54) REDUCING FLOATING DAGS AND STABILIZING TOPOLOGY IN LLNS USING LEARNING MACHINES

(71) Applicant: Cisco Technology, Inc., San Jose, CA (US)

(72) Inventors: Sukrit Dasgupta, Norwood, MA (US); Jean-Philippe Vasseur, Saint Martin d'Uriage (FR); Grégory Mermoud, Veyras (CH); Jonathan W. Hui, Belmont, CA (US)

(73) Assignee: Cisco Technology, Inc., San Jose, CA (US)

( * ) Notice: Subject to any disclaimer, the term of this patent is extended or adjusted under 35 U.S.C. 154(b) by 272 days.

(21) Appl. No.: 14/163,316

(22) Filed: Jan. 24, 2014

(65) Prior Publication Data
US 2015/0188801 A1    Jul. 2, 2015

Related U.S. Application Data

(60) Provisional application No. 61/922,208, filed on Dec. 31, 2013.

(51) Int. Cl.
| | | |
|---|---|---|
| *H04L 12/24* | (2006.01) | |
| *H04L 12/721* | (2013.01) | |
| *H04L 12/703* | (2013.01) | |
| *H04L 12/753* | (2013.01) | |
| *H04L 12/751* | (2013.01) | |

(52) U.S. Cl.
CPC ........... *H04L 45/14* (2013.01); *H04L 41/0886* (2013.01); *H04L 41/12* (2013.01); *H04L 41/16* (2013.01); *H04L 41/30* (2013.01); *H04L 45/28* (2013.01); *H04L 45/48* (2013.01); *H04L 45/026* (2013.01)

(58) Field of Classification Search
CPC ... G06F 8/61; G06N 99/005; H04L 12/5695; H04L 41/0816; H04L 41/12; H04L 41/142; H04L 43/00; H04L 43/103; H04L 45/00; H04L 45/125; H04L 41/0886; H04L 41/30; H04L 45/48; H04L 45/28; H04W 8/087
See application file for complete search history.

(56) References Cited

U.S. PATENT DOCUMENTS

| | | |
|---|---|---|
| 6,643,260 B1 | 11/2003 | Kloth et al. |
| 2004/0014467 A1* | 1/2004 | O'Neill ................ H04W 8/087 455/422.1 |
| 2005/0281205 A1 | 12/2005 | Chandwadkar et al. |

(Continued)

OTHER PUBLICATIONS

Dasgupta, et al., "Reducing Floating DAGs and Stabilizing Topology in LLNs Using Learning Machines", U.S. Appl. No. 61/922,208, filed Dec. 31, 2014, 26 pages, U.S. Patent and Trademark Office, Alexandria, VA.

(Continued)

*Primary Examiner* — Le H Luu
(74) *Attorney, Agent, or Firm* — Parker Ibrahim & Berg LLC; James M. Behmke; Stephen D. LeBarron

(57) ABSTRACT

In one embodiment, a device determines a topological profile of individual nodes in a shared-media communication network, and also determines a respective likelihood of the nodes in the network to become a root of a floating topology based on the topological profiles. Accordingly, the device may provide instructions to particular nodes in the network based on the respective likelihoods.

21 Claims, 9 Drawing Sheets

(56) References Cited

U.S. PATENT DOCUMENTS

| | | | |
|---|---|---|---|
| 2006/0007870 A1* | 1/2006 | Roskowski | H04L 43/00 370/252 |
| 2008/0025231 A1 | 1/2008 | Sharma et al. | |
| 2008/0056178 A1* | 3/2008 | Alexander | H04L 12/5695 370/328 |
| 2008/0114581 A1 | 5/2008 | Meir et al. | |
| 2009/0144443 A1 | 6/2009 | Vasseur et al. | |
| 2011/0029882 A1* | 2/2011 | Jaisinghani | H04L 41/12 715/736 |
| 2011/0041066 A1* | 2/2011 | Kimmet | G06F 8/61 715/736 |
| 2012/0192075 A1 | 7/2012 | Ebtekar et al. | |
| 2013/0067063 A1 | 3/2013 | Vasseur et al. | |
| 2013/0159548 A1* | 6/2013 | Vasseur | H04L 45/125 709/239 |
| 2014/0222729 A1* | 8/2014 | Dasgupta | G06N 99/005 706/12 |
| 2014/0222997 A1* | 8/2014 | Mermoud | H04L 41/142 709/224 |
| 2014/0372577 A1* | 12/2014 | Hui | H04L 41/0816 709/221 |
| 2015/0023186 A1* | 1/2015 | Vasseur | H04L 43/103 370/252 |
| 2015/0092538 A1* | 4/2015 | Vasseur | H04L 45/00 370/225 |

OTHER PUBLICATIONS

International Search Report dated Apr. 30, 2015 issued in connection with PCT/US2014/072749.
Winter, et al., "RPL: IPv6 Routing Protocol for Low-Power and Lossy Networks", Request for Comments 6550, Mar. 2012, 157 pages, Internet Engineering Task Force Trust.

* cited by examiner

REDUCING FLOATING DAGS AND STABILIZING TOPOLOGY IN LLNS USING LEARNING MACHINES

RELATED APPLICATION

This application claims priority to U.S. Provisional Application No. 61/922,208, filed Dec. 31, 2013, entitled: REDUCING FLOATING DAGS AND STABILIZING TOPOLOGY IN LLNS USING LEARNING MACHINES, by Dasgupta, et al., the contents of which are herein incorporated by reference.

TECHNICAL FIELD

The present disclosure relates generally to computer networks, and, more particularly, to the use of learning machines within computer networks.

BACKGROUND

Low power and Lossy Networks (LLNs), e.g., Internet of Things (IoT) networks, have a myriad of applications, such as sensor networks, Smart Grids, and Smart Cities. Various challenges are presented with LLNs, such as lossy links, low bandwidth, low quality transceivers, battery operation, low memory and/or processing capability, etc. The challenging nature of these networks is exacerbated by the large number of nodes (an order of magnitude larger than a "classic" IP network), thus making the routing, Quality of Service (QoS), security, network management, and traffic engineering extremely challenging, to mention a few.

Machine learning (ML) is concerned with the design and the development of algorithms that take as input empirical data (such as network statistics and performance indicators), and recognize complex patterns in these data. In general, these patterns are then used to make decisions automatically (i.e., close-loop control) or to help make decisions. ML is a very broad discipline used to tackle very different problems (e.g., computer vision, robotics, data mining, search engines, etc.), but the most common tasks are the following: linear and non-linear regression, classification, clustering, dimensionality reduction, anomaly detection, optimization, association rule learning.

One very common pattern among ML algorithms is the use of an underlying model M, whose parameters are optimized for minimizing the cost function associated to M, given the input data. For instance, in the context of classification, the model M may be a straight line that separates the data into two classes such that $M=a*x+b*y+c$ and the cost function would be the number of misclassified points. The ML algorithm then consists in adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

Learning Machines (LMs) are computational entities that rely one or more ML algorithm for performing a task for which they haven't been explicitly programmed to perform. In particular, LMs are capable of adjusting their behavior to their environment. In the context of LLNs, and more generally in the context of the IoT (or Internet of Everything, IoE), this ability will be very important, as the network will face changing conditions and requirements, and the network will become too large for efficiently management by a network operator.

Thus far, LMs have not generally been used in LLNs, despite the overall level of complexity of LLNs, where "classic" approaches (based on known algorithms) are inefficient or when the amount of data cannot be processed by a human to predict network behavior considering the number of parameters to be taken into account.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
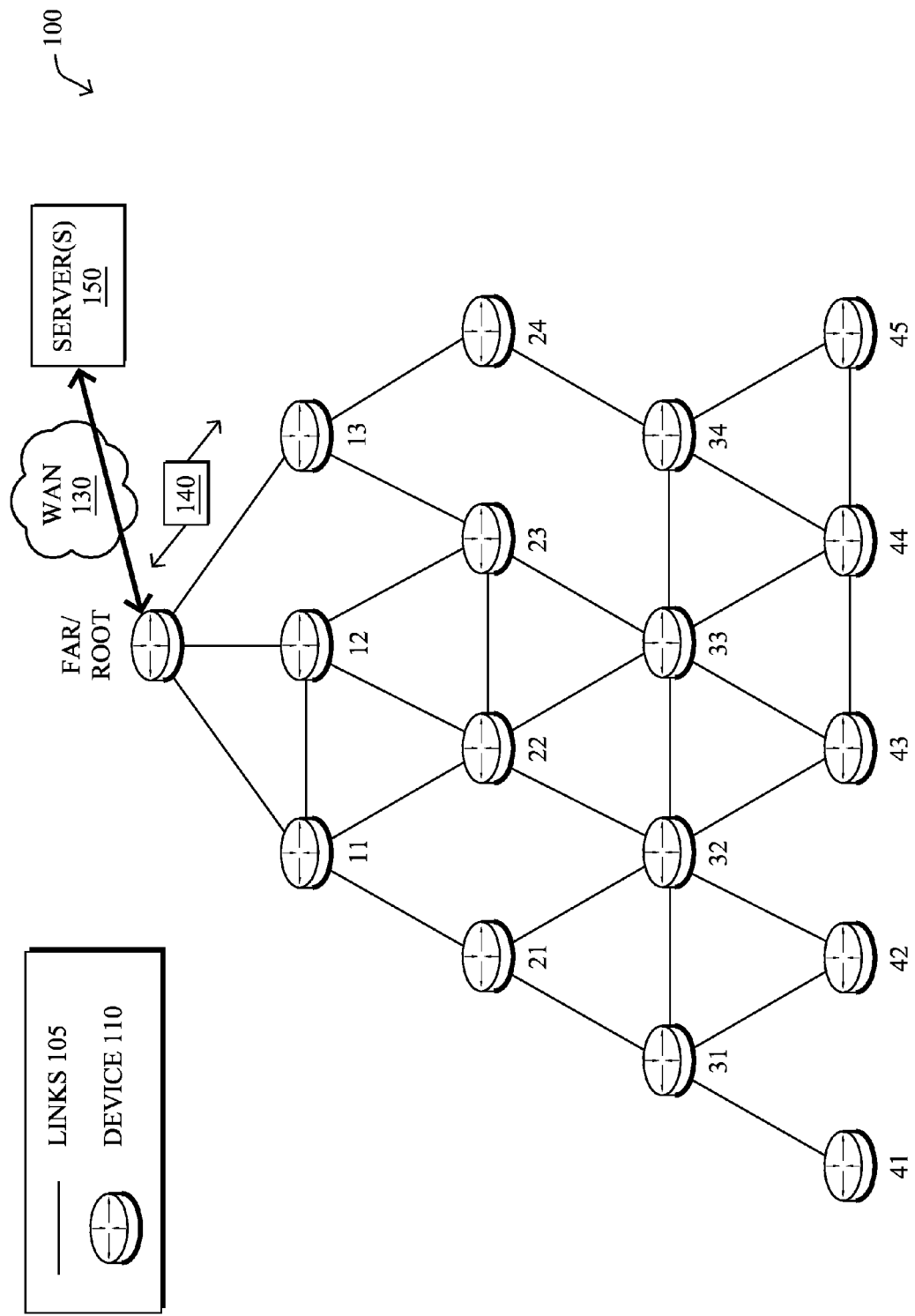
FIG. 1 illustrates an example communication network.

According to one or more embodiments of the disclosure, techniques are shown and described relating to reducing floating DAGs and stabilizing topology in LLNs using learning machines. In particular, in one embodiment, a device determines a topological profile of individual nodes in a shared-media communication network, and also determines a respective likelihood of the nodes in the network to become a root of a floating topology based on the topological profiles. Accordingly, the device may provide instructions to particular nodes in the network based on the respective likelihoods.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE 1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1 is a schematic block diagram of an example computer network 100 illustratively comprising nodes/devices 110 (e.g., labeled as shown, "root," "11," "12," . . . "45," and described in FIG. 2 below) interconnected by various methods of communication. For instance, the links 105 may be wired links or shared media (e.g., wireless links, PLC links, etc.) where certain nodes 110, such as, e.g., routers, sensors, computers, etc., may be in communication with other nodes 110, e.g., based on distance, signal strength, current operational status, location, etc. The illustrative root node, such as a field area router (FAR) of a FAN, may interconnect the local network with a WAN 130, which may house one or more other relevant devices such as management devices or servers 150, e.g., a network management server (NMS), a dynamic host configuration protocol (DHCP) server, a constrained application protocol (CoAP) server, etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" node, the network 100 is merely an example illustration that is not meant to limit the disclosure.

Data packets 140 (e.g., traffic and/or messages) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
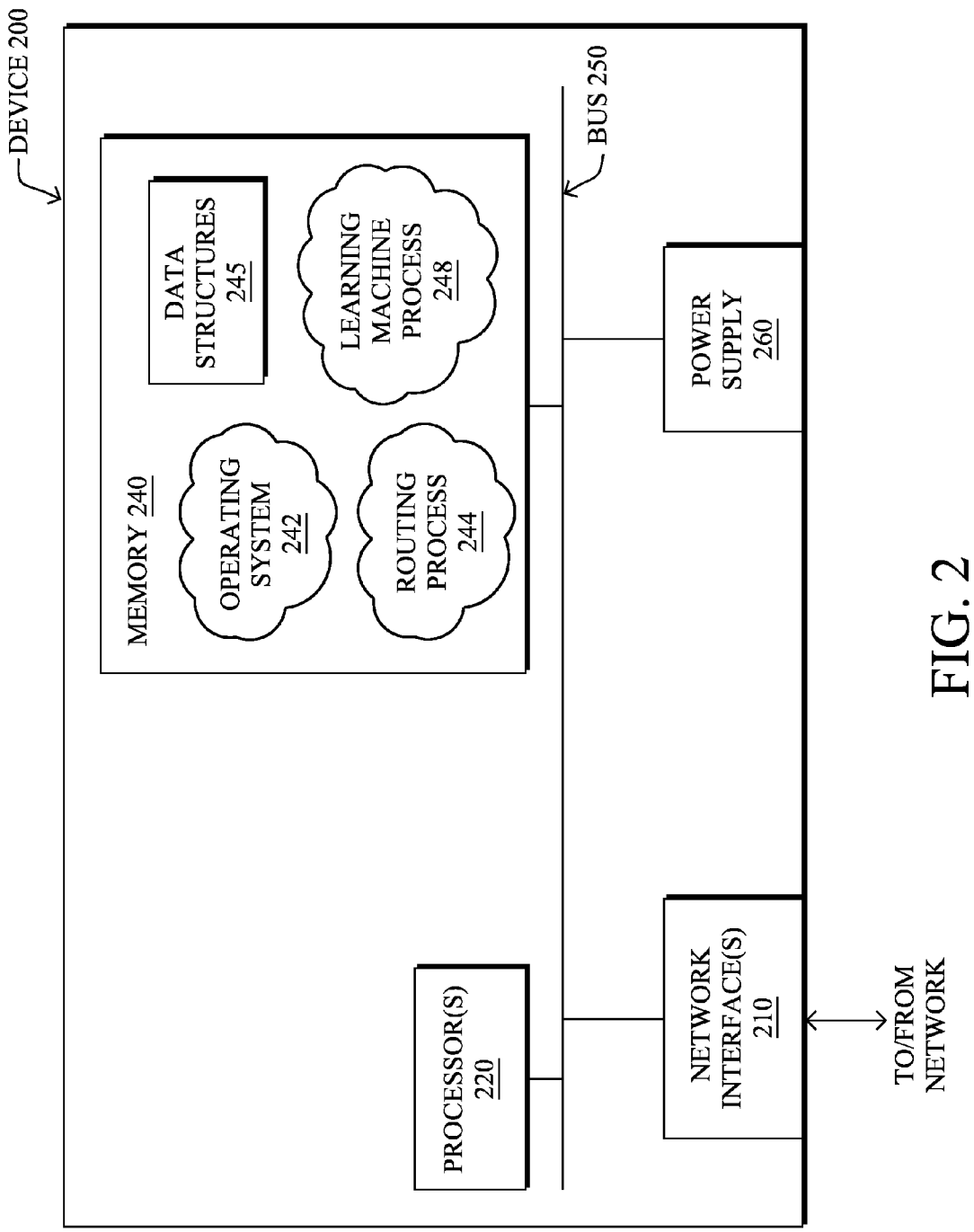
FIG. 2 illustrates an example network device/node.

FIG. 2 is a schematic block diagram of an example node/device 200 that may be used with one or more embodiments described herein, e.g., as any of the nodes or devices shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC (where the PLC signal may be coupled to the power line feeding into the power supply) the network interface 210 may communicate through the power supply 260, or may be an integral component of the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise a routing process/services 244 and an illustrative "learning machine" process 248, which may be configured depending upon the particular node/device within the network 100 with functionality ranging from intelligent learning machine algorithms to merely communicating with intelligent learning machines, as described herein. Note also that while the learning machine process 248 is shown in centralized memory 240, alternative embodiments provide for the process to be specifically operated within the network interfaces 210.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

An example implementation of LLNs is an "Internet of Things" network. Loosely, the term "Internet of Things" or "IoT" (or "Internet of Everything" or "IoE") may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs), FARs, or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

Also, a directed acyclic graph (DAG) is a directed graph having the property that all edges are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Note also that a tree is a kind of DAG, where each device/node in the DAG generally has one parent or one preferred parent. DAGs may generally be built (e.g., by a DAG process and/or routing process 244) based on an Objective Function (OF). The role of the Objective Function is generally to specify rules on how to build the DAG (e.g. number of parents, backup parents, etc.).

Figure 3:
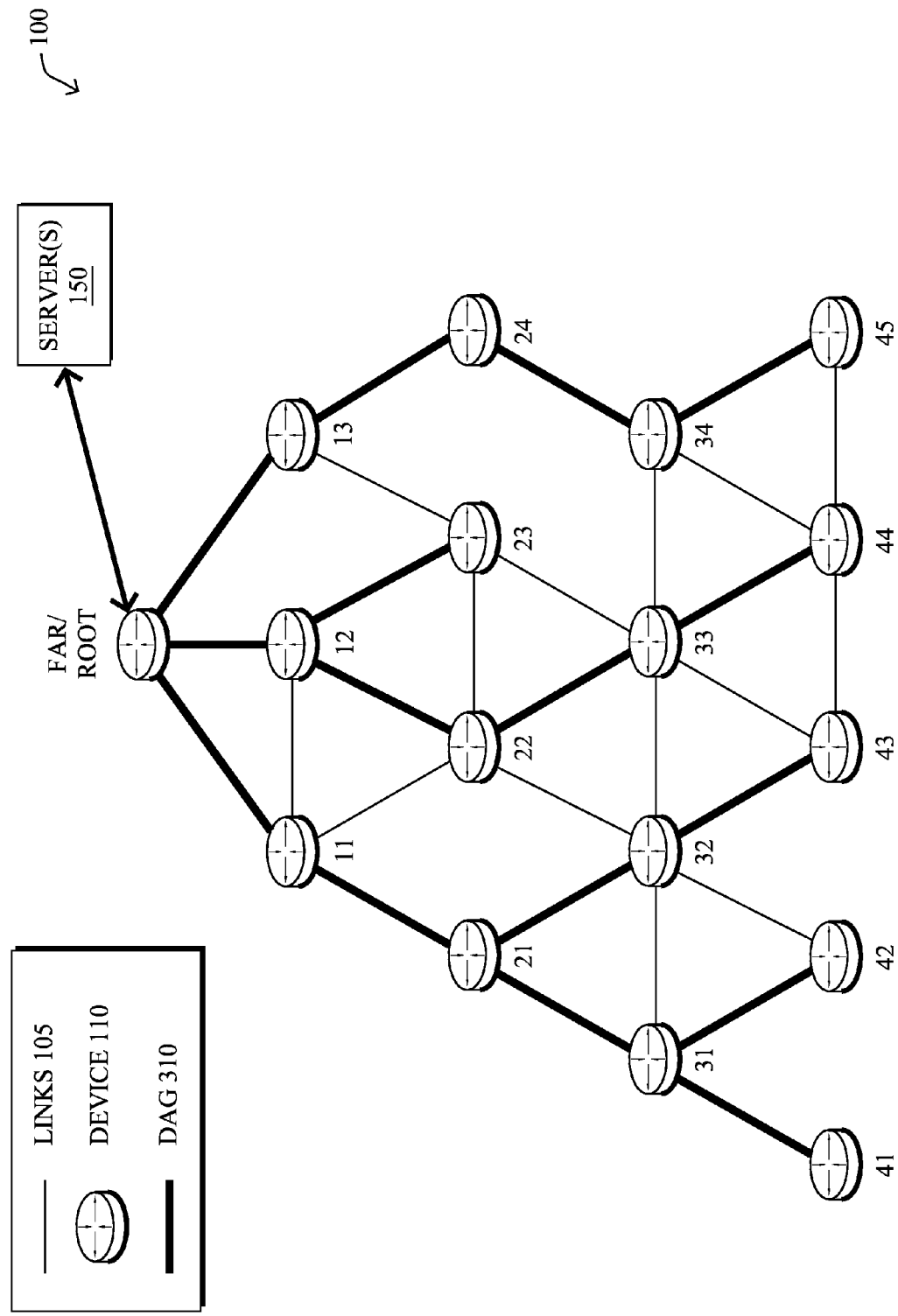
FIG. 3 illustrates an example directed acyclic graph (DAG) in the communication network of FIG. 1

FIG. 3 illustrates an example simplified DAG that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 310 (shown as bolded lines), which extends from the root node toward one or more leaf nodes (nodes without children). Traffic/packets 140 (shown in FIG. 1) may then traverse the DAG 310 in either the upward direction toward the root or downward toward the leaf nodes, particularly as described herein.

Notably, RPL supports two modes of operation for maintaining and using downward routes:

1) Storing Mode: RPL routers unicast DAO messages directly to their DAG Parents. In turn, RPL routers maintain reachable IPv6 addresses for each of their DAG Children in their routing table. Because intermediate RPL routers store Downward routing state, this mode is called Storing mode.

2) Non-Storing Mode: RPL routers unicast DAO messages directly to the DAG Root. The DAO message also includes the IPv6 addresses for the source's DAG Parents. By receiving DAO messages from each RPL router in the network, the DAG Root obtains information about the DAG topology and can use source routing to deliver datagrams. Unlike Storing mode, intermediate RPL routers in Non-Storing mode do not maintain any Downward routes.

Learning Machine Technique(s)

As noted above, machine learning (ML) is concerned with the design and the development of algorithms that take as input empirical data (such as network statistics and performance indicators), and recognize complex patterns in these data. One very common pattern among ML algorithms is the use of an underlying model M, whose parameters are optimized for minimizing the cost function associated to M, given the input data. For instance, in the context of classification, the model M may be a straight line that separates the data into two classes such that M=a*x+b*y+c and the cost function would be the number of misclassified points. The ML algorithm then consists in adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

As also noted above, learning machines (LMs) are computational entities that rely one or more ML algorithm for performing a task for which they haven't been explicitly programmed to perform. In particular, LMs are capable of adjusting their behavior to their environment. In the context of LLNs, and more generally in the context of the IoT (or Internet of Everything, IoE), this ability will be very important, as the network will face changing conditions and requirements, and the network will become too large for efficiently management by a network operator. Thus far, LMs have not generally been used in LLNs, despite the overall level of complexity of LLNs, where "classic" approaches (based on known algorithms) are inefficient or when the amount of data cannot be processed by a human to predict network behavior considering the number of parameters to be taken into account.

Notably, RPL specifies the notion of a "Floating DAG". Floating DAGs are sub-DAGs of the main DAG that get disconnected from the main DAG. They can arise from two situations:

1. The root of the sub-DAG has not been heard from in a long time (and thus the root of the Floating DAG did not send any northbound traffic that would have allowed it to detect that its parent(s) are unreachable)
2. No southbound traffic can be sent to any node in the Floating-DAG and ICMP errors keep arising while trying to transmit to the root of the corresponding sub-DAG.

Within a Floating DAG, inner connectivity is preserved but there is no connectivity to the main DAG preventing flow of traffic from and to nodes outside of the floating DAGs. Even though the objective function is satisfied, the Floating-DAG roots can no longer be reached through any of its parents (primary or backup). This can lead to all kinds of disconnections and re-arrangements in the DAG irrespective of the underlying routing protocol. As long as they exist, traffic disruptions continue to occur in both the upstream and downstream direction. Note that Floating-DAGs have been observed in various deployed networks.

The techniques herein thus reduce the occurrence of Floating-DAGs and alleviate the traffic disruption arising from it. (Although this idea has been conceived with RPL Floating-DAGs in mind, this mechanism can be generalized to solve similar disconnection problems arising in mesh networks due to the lossy and asymmetric nature of wireless media.) In particular, the techniques herein propose a mechanism to handle the frequent occurrence of floating DAGs in order to reduce traffic disruption, wherein a Topology Profiler component uses data analytics by maintaining a connectivity profile for the topology, and tracks ICMP destination unreachable errors and determines whether it is resulting in isolated sub-DAGs or singular nodes. A statistical tool (e.g., a classifier) is then used to determine the susceptibility of a node to become the root of a floating-DAG based on observed metrics such as ETX, RSSI etc. This component can then discard the susceptibility of some nodes based on thresholds and track only the most frequent ones. The Topology Moderator component uses this knowledge to proactively remedy potential floating-DAG formations. It initiates keep-alive timers between potentially disconnecting nodes to get instant notification of a disconnection. It can also use a LM to modify the objective function/node metric to alleviate the situation by modifying the topology if it is determined that keepalives are not solving the issue due to unusable links. This is done using a new "Attractiveness" metric computed by a LM as well. This metric is used to encourage or discourage nodes from picking certain other nodes as parents. The LM also functions to determine the dependence of topology stability on different classes of traffic and decides what action might be required based on the corresponding requirements.

Illustratively, the techniques described herein may be performed by hardware, software, and/or firmware, such as in accordance with the learning machine process 248, which may contain computer executable instructions executed by the processor 220 (or independent processor of interfaces 210) to perform functions relating to the techniques described herein, e.g., optionally in conjunction with other processes. For example, certain aspects of the techniques herein may be treated as extensions to conventional protocols, such as the various communication protocols (e.g., routing process 244), and as such, may be processed by similar components understood in the art that execute those protocols, accordingly. Also, while certain aspects of the techniques herein may be described from the perspective of a single node/device, embodiments described herein may be performed as distributed intelligence, also referred to as edge/distributed computing, such as hosting intelligence within nodes 110 of a Field Area Network in addition to or as an alternative to hosting intelligence within servers 150.

Operationally, the techniques herein consist of several components, each with a specific role to improve the disconnections and traffic disruptions that arise from Floating DAGs. Specifically, the techniques herein introduce two new components, illustratively executing on the DAG root (e.g., a Field Area Router). The first component called the Topology Profiler keeps track of all nodes and their connectivity profiles, making use of historical data. From this profile, historical information about their connectivity, parent selection, parent changes (routing dynamics), etc. can be retrieved. The second module called Topology Moderator closes the loop by using information from the first component to communicate with the nodes to keep the topology stable when floating DAGs start to form. Each module/component may illustratively be embodied as portions of the "learning machine" process 248.

Topology Profiler component (TPC): This component is responsible for tracking the topological profile of a node. Note that, as observed in the field, such profiles may dramatically vary with the network, environmental conditions but also according to time for a given node. There are multiple topological metrics that the TPC can track such as the size of its southbound sub-DAG, unique parent changes and connectivity changes with parents for any given node in the network. The metric to track connectivity changes with neighbors that may become parents will specifically be used to compute the occurrence of floating-DAGs.

Figure 4:
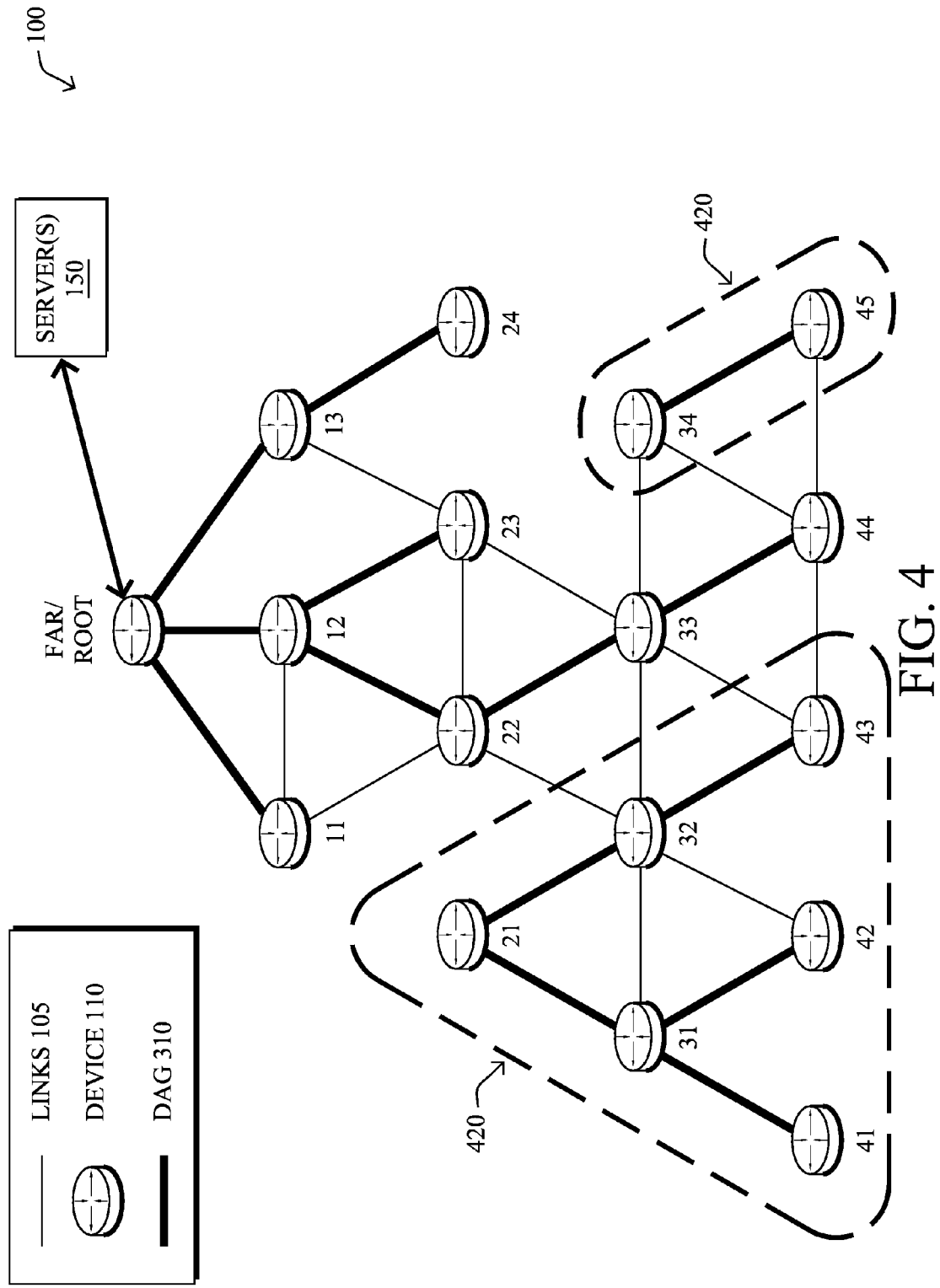
FIG. 4 illustrates an example of a floating DAG.
Figure 5:
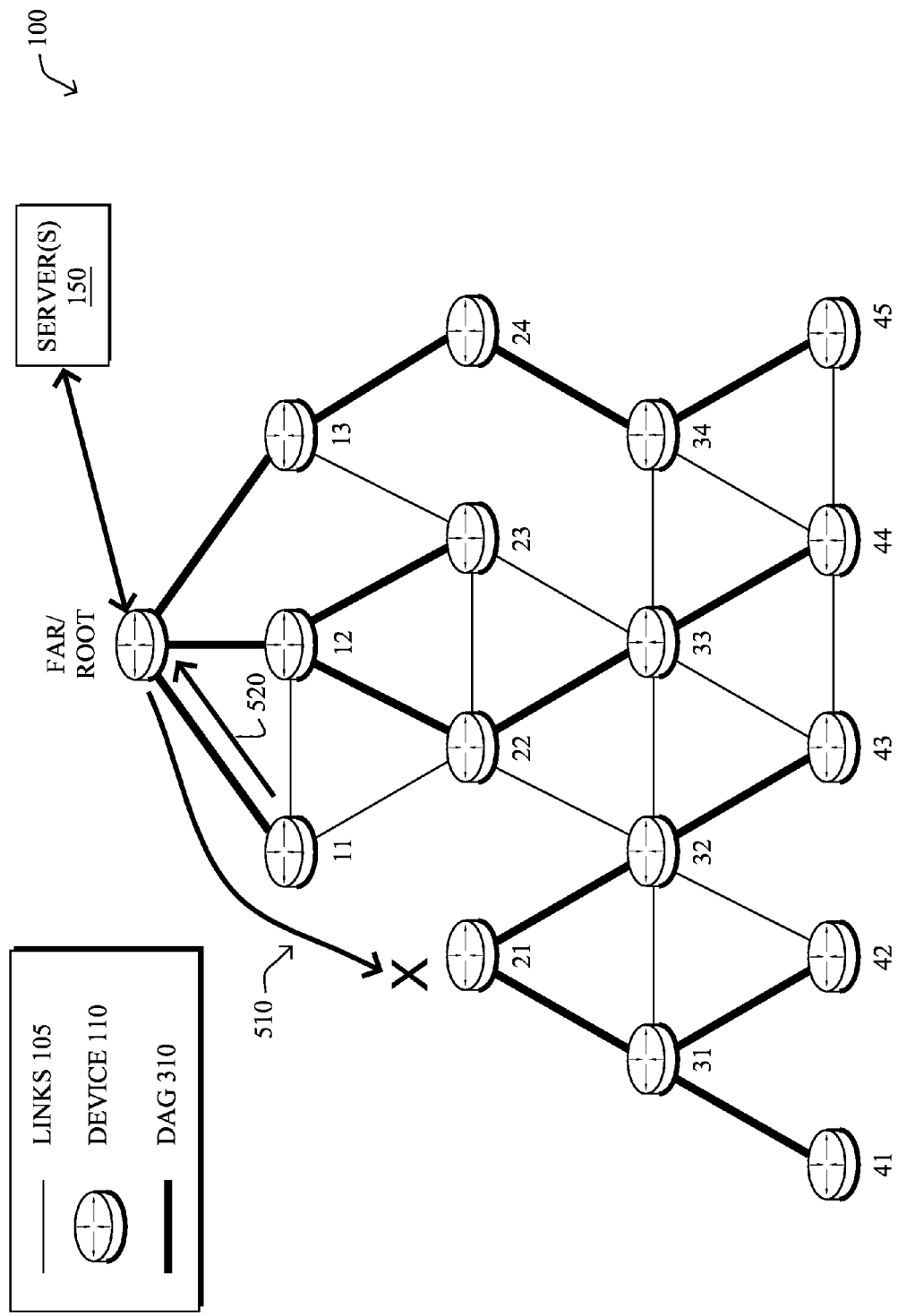
FIG. 5 illustrates an example of floating DAG detection.

The TPC consists in collecting information related to the nodes of the nodes in order to determine the nodes that are more likely to become root of floating DAGs. As mentioned above, the DAG root determines the presence of a floating DAG when a particular node cannot be reached through any of its parents (backup or primary). For example, with reference to FIG. 4, node 21 might often lose connectivity with node 11, thus making its sub-DAG (nodes 31, 32, 41, 42, and 43) a floating DAG 420 rooted at node 21. In addition, node 34 may lose connectivity to node 24, an as such its sub-DAG (node 45) would be a floating DAG 420 rooted at node 34. In this situation, as shown in FIG. 5, if a data packet 540 is sent to the root of the floating DAG (e.g., node 21) or any node that belongs to its sub-DAG, an ICMP Destination Unreachable error 550 originates from an intermediate node (e.g., node 11) on the path to the destination node. Once the ICMP error is received the TPC inspect its routing topology to determine whether the unreachable node is simply a disconnected leaf node or a node with "children"

in which case, it may have become a Floating DAG. If the unreachable node is flagged as a potential floating DAG root, the TPC may trigger a set of active probing in order to determine the period during which that node tends to move between parents and also becomes the DAG root of a floating DAG.

One of the tasks of the TPC will be to keep a track of all the ICMP error packets being received and correlating them with the original destination to determine which nodes have a tendency to get disconnected from the main DAG and thus become a floating DAG root. From the historical profile of this metric, the DAG root can determine what nodes are most often floating DAG roots. In other words, the aim of the TPC is to identify, thanks to historical data consumed by a Learning Machine (LM) as explained below, the set of nodes that have a substantially higher probability to form a floating DAG (i.e. become root of floating DAGs). To that end, for each node in the network, the TPC collects the following set of data:

* Rates at which ICMP errors are received, meaning that a node became the root of the floating DAG, from which the frequency F at which a node N becomes a floating DAG is computed. F(N) where is the Node may be a simple scalar, a vector (number of times, duration, etc).
* The Number of nodes contained in the sub-DAG of the node Nb(N).

Both parameters are quite critical: the first parameter F(N) characterizes the probability/frequency of a node N to become the DAG root of a floating DAG where the second parameter NB(N) provides an indication of the consequence (indeed if a node N is frequently "floating" bringing with it a small number of nodes, the issue is less critical, such as, perhaps, node 34, versus, say, node 21).

Once the parameters F(N) and NB(N) for each node have been collected, the TPC may discard nodes for which F(N) and NB(N) are below a set of configured thresholds. Note that the case of a leaf disconnected is discarded thanks to this mechanism (NB(N)=1). Then the TPC makes use of a classifier in order to identify the nodes that differs from other nodes for both F(N) and NB(N). Indeed, if the whole DAG is unstable leading to a number of floating DAG, no specific action may be taken. In contrast, if specific nodes have the tendency to become root of floating DAGs while attracting a large enough number of nodes, we use a closed loop control mechanism to mitigate the issue. A statistical classifier can be used to determine if a given node is particularly susceptible to become root of a floating DAG. More specifically, statistical classifiers are algorithms that identify to which set of categories a new observation belong based on prior observations. In our case, an observation is characterized by a feature vector $x\_i$, which represents the network properties of a specific node (e.g., path ETX, hopcount, RSSI, etc.) and a corresponding category $c\_i$, which in our case may take one of two values that denote whether the node Ni is susceptible to become root of a floating DAG or not.

As this module continues to process the topological changes, it starts to notify the Topology Moderator component of the nodes that have a tendency to disconnect from their parents and become floating DAG roots. In one embodiment, it generates a list of nodes each with a numeric rank corresponding to their tendency to disconnect.

Topology Moderator component (TMC): The responsibility of this component is to communicate with the nodes (and potentially their children) that could be involved in the formation of a floating DAG. This could either be the potential floating DAG root, or it could be the parent to which the floating DAG root is connected currently. The TMC can be used for two purposes: 1) Dynamically activate KA (Keep Alive) to increase the speed of detecting when a floating DAG forms where required (according to the LM); 2) Potentially dynamically modify the Objective Function/Metric for that node (is order to discourage nodes to join nodes that have the tendency to become floating DAG root).

Figure 6:
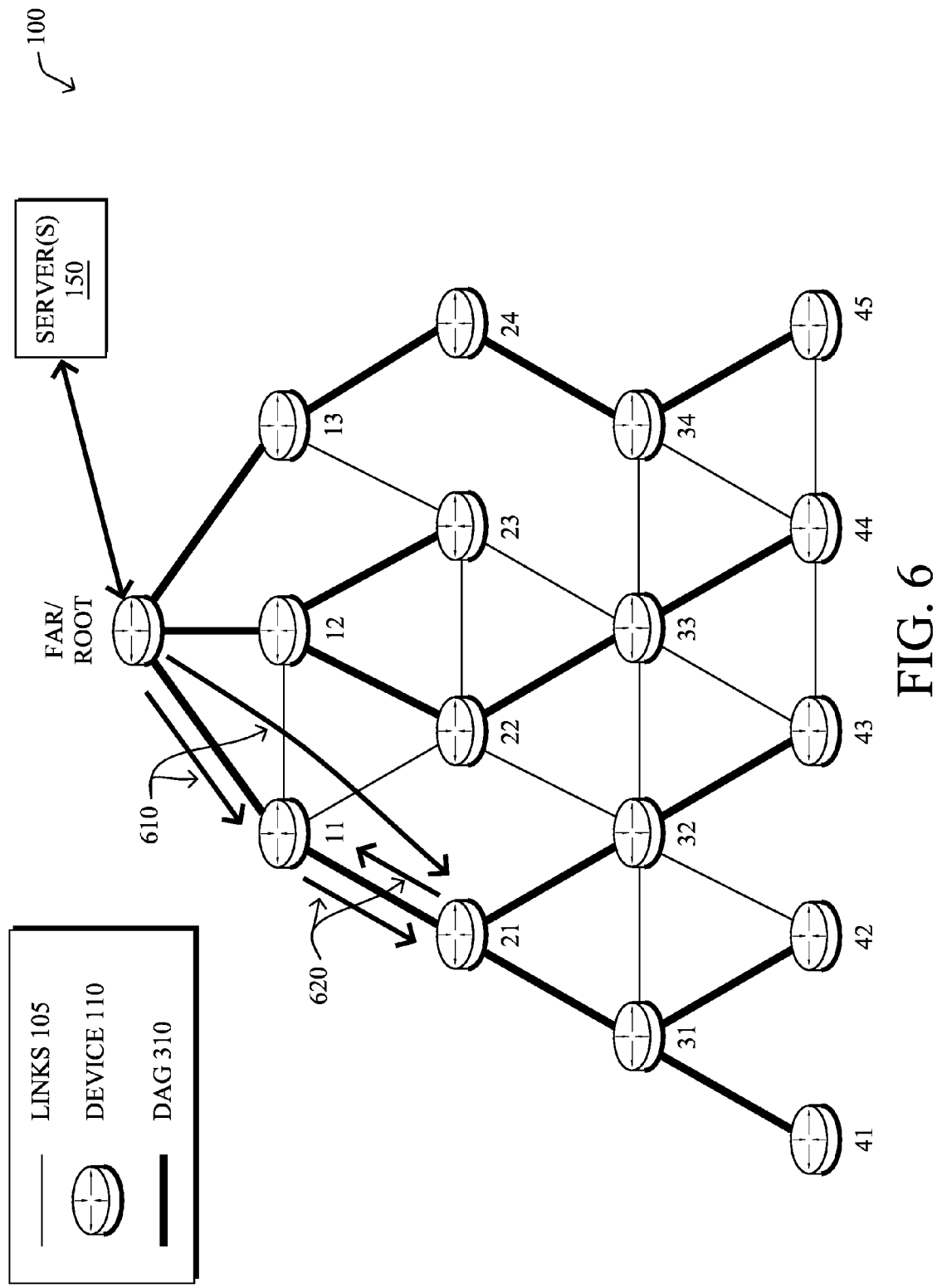
FIGS. 6-8 illustrate examples of floating DAG mitigation.

In one embodiment, as shown in FIG. 6, the TMC notifies both the parent and its child to setup keep-alive (KA) messages between themselves to detect a link down as soon as it happens (instructions 610 and keepalives 620). This keep-alive message timer can be determined based on the tendency disconnect rank given by the TPC. Once the keep-alive messages fail, the parent will instantly know of a disconnection and then could use a back-off timer mechanism to wait and retry before sending a messages to the DAG root for notifying it to start rerouting packets around this link. In another embodiment, until the time this back-off is in place, transit packets reaching this parent can be buffered locally for re-transmission when the back-off period is over, this will prevent a retransmission from the DAG root and will be quicker. In another embodiment, keep-alive messages can be initiated between the node (potential floating DAG root) and all its backup parents. In another embodiment, this component also receives feedback from the parent that has started keep-alive messaging. If keep-alive messaging is indeed improving the situation the parent should be generating much less ICMP Destination Unreachable packets. In those situations where the situation does not change even after keepalives, this component could determine this to be an environmental situation and tell the child to never pick this particular parent (or in another embodiment, select it only after a large amount of time has elapsed and the possible environmental condition has passed). Also, in this case, this component will notify the parent to stop the keep-alive messages, as they are not yielding the desired effect.

Figure 7:
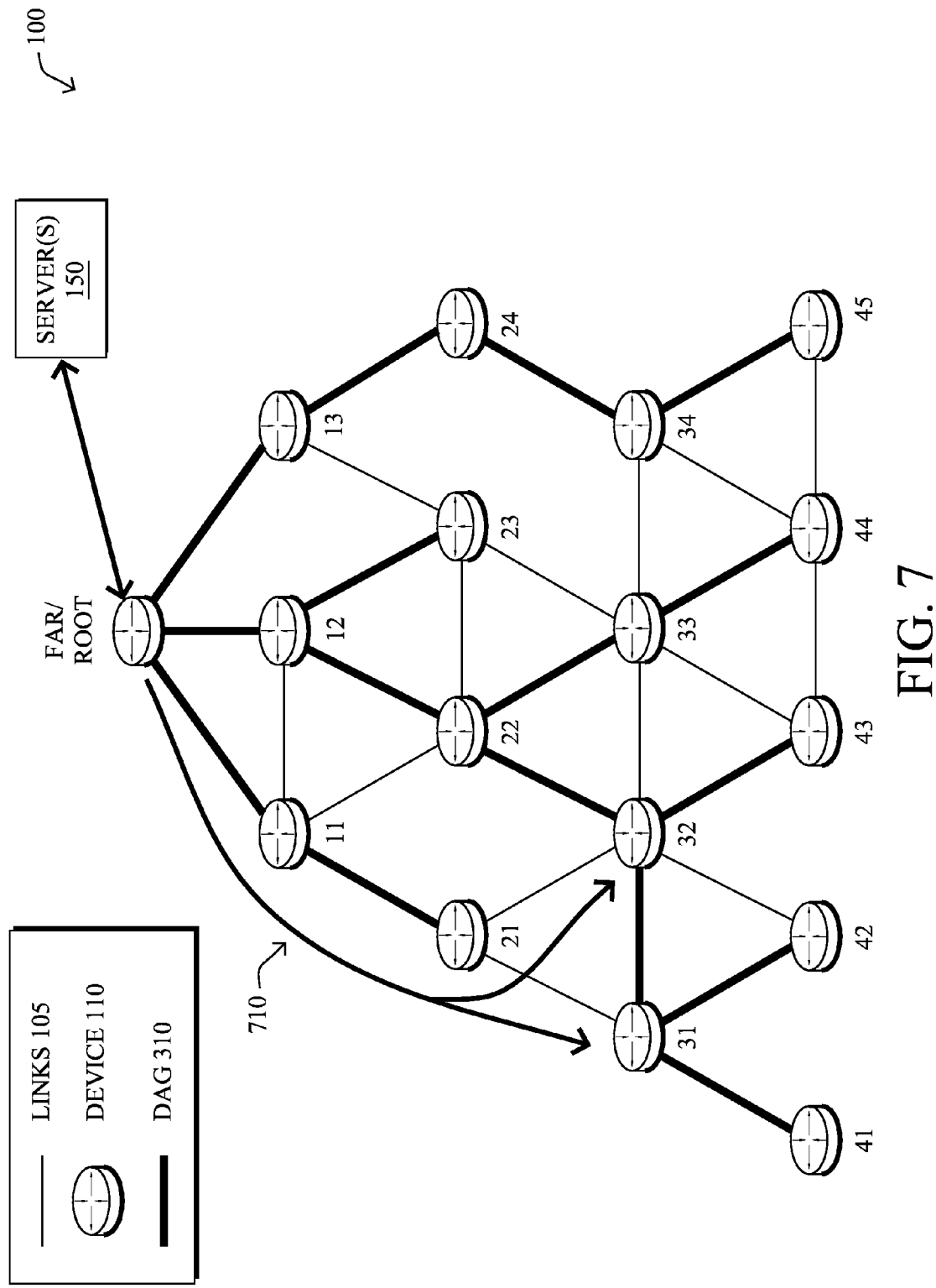

The second action that may be taken (orthogonal to the activation of KA in order to avoid floating DAGs) may be to perform a LM-based local modification of the OF/Node Metric. Indeed, if the LM determines that a node N continues to frequently be the root of a floating DAG, the issue may be environmental: for example, because of external interferences a node may have unstable links to all of its parents that cannot be captured by the smooth computation of the link metrics such as the ETX. In that case, it may be appropriate to modify the OF/Node routing metric, to encourage nodes in the sub-DAG to select a route that no longer has the problem node as an ancestor. To that end, the techniques herein propose to send a newly defined control message from the TMC to the node N computed by the LM, which will consequently tune a newly defined node routing metric called Attractiveness of the node (At). The At routing metric is a node metric (as specified in RFC 6551), used to encourage/discourage other nodes to join the sub-DAG rooted at node N. The At parameter is then dynamically adjusted thanks to the close loop feed-back by the LM. For example, as shown in FIG. 7, this instruction 710 may cause a shift in the underlying routing topology of the sub-DAG subject to become floating, as described above.

Figure 8:
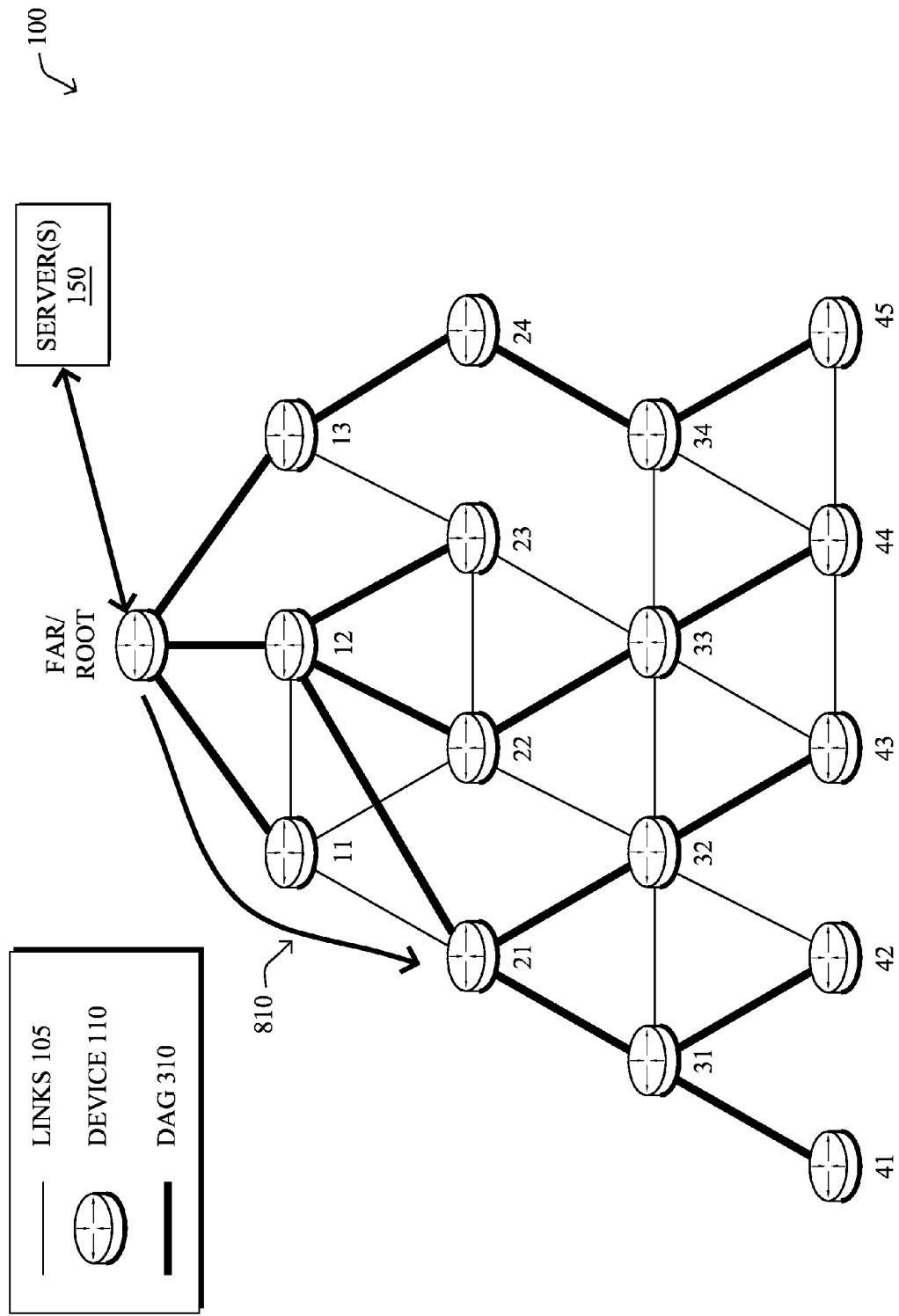

In another embodiment, the root of a floating DAG can be notified to modify the best-next hop selection process (e.g. tune the RSSI threshold), such as through instructions 810 in FIG. 8. This can be done either through a newly defined CSMP or directed DIOs. This will ensure that this node has the ability to select parents with whom the channel quality is not necessarily the best, but instead is stable (e.g., node 21 selecting node 12). In yet another embodiment, this component might determine that for some types of traffic such as AMI, the occasional occurrence of floating DAGs is acceptable but for more sensitive traffic such as distributed automation (DA), floating DAGs need to be avoided. So in this situation, this component could use time based topology moderation in accordance with when AMI traffic is traversing the network as opposed to DA traffic.

Figure 9:
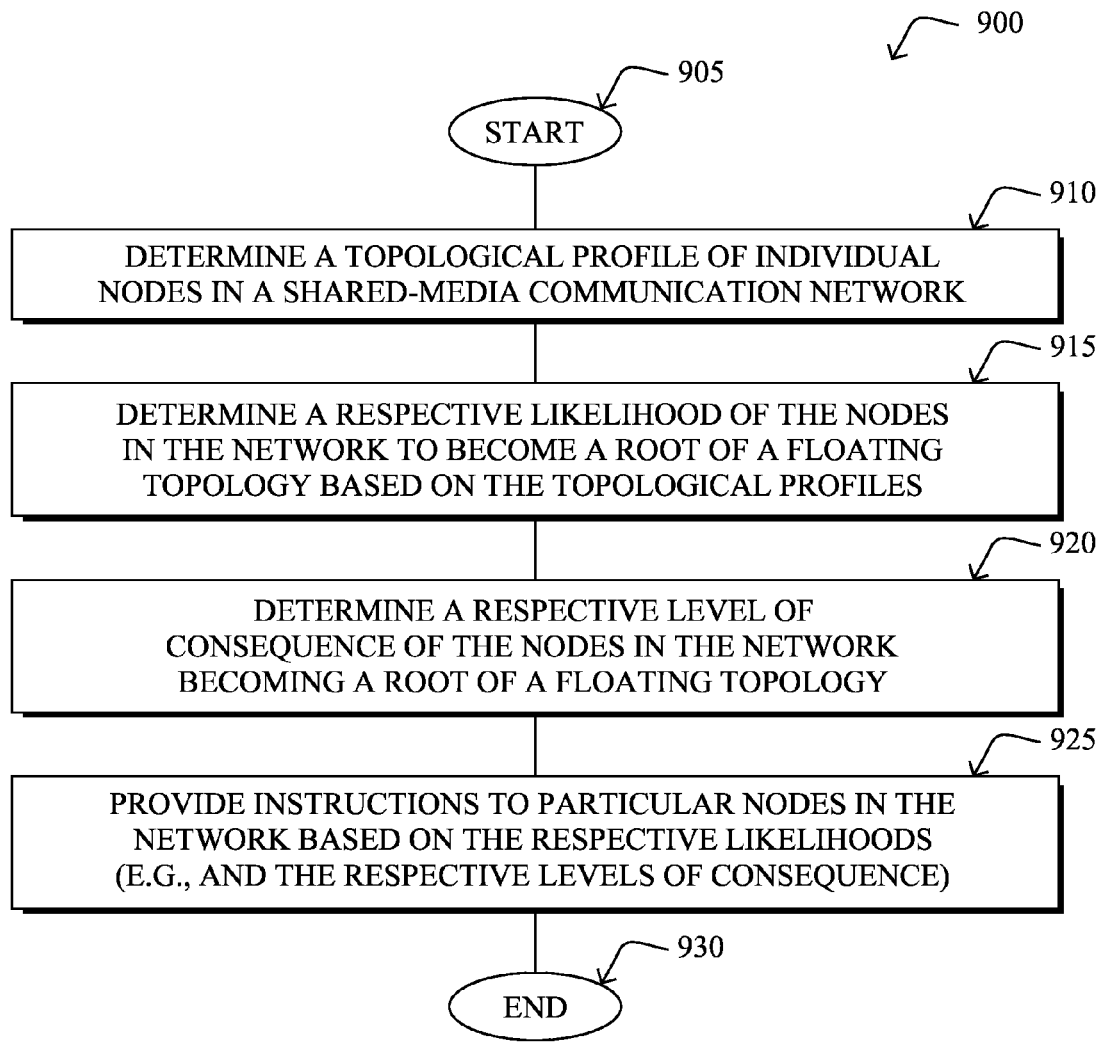
FIG. 9 illustrates an example simplified procedure for reducing floating DAGs and stabilizing topology in LLNs using learning machines.

FIG. 9 illustrates an example simplified procedure 900 for reducing floating DAGs and stabilizing topology in LLNs using learning machines in accordance with one or more embodiments described herein. The procedure 900 may start at step 905, and continues to step 910, where, as described in greater detail above, a device (e.g., a FAR, NMS, etc.) determines a topological profile of individual nodes in a shared-media communication network (e.g., historical information about one or more of: connectivity, parent selecting, parent changes, child nodes, routing topology, etc.). Based on the topological profiles, the device may then determine a respective likelihood of the nodes in the network to become a root of a floating topology in step 915. Additionally, in certain embodiments, in step 920 a respective level of consequence of the nodes in the network becoming a root of a floating topology may also be determined (e.g., estimating a number of nodes within a corresponding floating topology of a respective node). Based on the respective likelihoods (e.g., and based on the respective levels of consequence), the device may then provide instructions to particular nodes in the network, accordingly. For instance, as described above, the provided instructions may comprise activating a keepalive exchange (e.g., and a specified timer for the keepalive exchange), modifying a routing topology to avoid indicated nodes (e.g., changing one or both of an objective function of the routing topology or a routing metric of one or more nodes), and modifying an alternate next-hop selection to increase parental selection options.

The illustrative and simplified procedure 900 ends in step 930. Note that though the procedure is shown with an end, the techniques described herein may continue to update topology profiles, determine likelihoods and consequences of floating DAGs, and may provide instructions, accordingly.

It should be noted that while certain steps within procedure 900 may be optional as described above, the steps shown in FIG. 9 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for reducing floating DAGs and stabilizing topology in LLNs using learning machines. In particular, the techniques herein provide the following features:
1. Statistical and historical profiles of node behavior allow the components to prepare for the occurrence of floating DAGs and thus reduce traffic disruption.
2. Nodes involved in the formation of a floating DAG now have knowledge of their behavior and can act accordingly.
3. The duration of existence of floating DAGs is reduced as keep-alive messages immediately notify of disconnections before traffic retransmissions take place from the root.
4. The overall topology is stable and connected for longer durations.
5. Traffic loss in upstream and downstream direction is reduced as floating DAGs exist for shorter durations.

While there have been shown and described illustrative embodiments that provide for reducing floating DAGs and stabilizing topology in LLNs using learning machines, it is to be understood that various other adaptations and modifications may be made within the spirit and scope of the embodiments herein. For example, the embodiments have been shown and described herein with relation to LLNs and related protocols. However, the embodiments in their broader sense are not as limited, and may, in fact, be used with other types of communication networks and/or protocols. In addition, while the embodiments have been shown and described with relation to learning machines in the specific context of communication networks, certain techniques and/or certain aspects of the techniques may apply to learning machines in general without the need for relation to communication networks, as will be understood by those skilled in the art. Further, although the techniques herein have been described in the context of RPL, it is not tied to RPL but applies to all distributed routing protocols that build DAGs. Due to the nature of wireless media disconnections of nodes always take place and the techniques herein can be used to alleviate the situation.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
    determining, by a network device executing a learning machine process, a topological profile of individual nodes in a shared-media communication network;
    determining, by the network device, a respective likelihood of the nodes in the network to become a root of a floating topology based on the topological profiles, wherein the floating topology is a sub-topology of a main topology that is likely to become disconnected from the main topology; and
    sending, from the network device, instructions to particular nodes in the network based on the respective likelihoods.

2. The method as in claim 1, further comprising:
    determining a respective level of consequence of the nodes in the network becoming the root of the floating topology; and
    sending instructions to particular nodes in the network based on the respective levels of consequence.

3. The method as in claim 2, wherein determining the respective levels of consequence comprises:
    estimating a number of nodes within a corresponding floating topology of a respective node.

4. The method as in claim 1, wherein the topological profile comprises historical information about one or more of: connectivity, parent selecting, parent changes, child nodes, and routing topology.

5. The method as in claim 1, wherein the sent instructions comprise activating a keepalive exchange.

6. The method as in claim 5, wherein the sent instructions further comprise a specified timer for the keepalive exchange.

7. The method as in claim 1, wherein the sent instructions comprise modifying a routing topology to avoid indicated nodes.

8. The method as in claim 7, wherein the sent instructions further comprise changing one or both of an objective function of the routing topology or a routing metric of one or more nodes.

9. The method as in claim 1, wherein the sent instructions comprise modifying an alternate next-hop selection to increase parental selection options.

10. An apparatus, comprising:
one or more network interfaces that communicate with a shared-media computer network;
a processor coupled to the one or more network interfaces and configured to execute a learning machine process; and
a memory configured to store the learning machine process executable by the processor, the learning machine process when executed operable to:
determine a topological profile of individual nodes in the shared-media communication network;
determine a respective likelihood of the nodes in the network to become a root of a floating topology based on the topological profiles, wherein the floating topology is a sub-topology of a main topology that is likely to become disconnected from the main topology; and
send instructions to particular nodes in the network based on the respective likelihoods.

11. The apparatus as in claim 10, wherein the learning machine process when executed is further operable to:
determine a respective level of consequence of the nodes in the network becoming the root of the floating topology; and
send instructions to particular nodes in the network based on the respective levels of consequence.

12. The apparatus as in claim 11, wherein the learning machine process when executed to determine the respective levels of consequence is further operable to:
estimate a number of nodes within a corresponding floating topology of a respective node.

13. The apparatus as in claim 10, wherein the topological profile comprises historical information about one or more of: connectivity, parent selecting, parent changes, child nodes, and routing topology.

14. The apparatus as in claim 10, wherein the sent instructions comprise activating a keepalive exchange.

15. The apparatus as in claim 14, wherein the sent instructions further comprise a specified timer for the keepalive exchange.

16. The apparatus as in claim 10, wherein the sent instructions comprise modifying a routing topology to avoid indicated nodes.

17. The apparatus as in claim 16, wherein the sent instructions further comprise changing one or both of an objective function of the routing topology or a routing metric of one or more nodes.

18. The apparatus as in claim 10, wherein the sent instructions comprise modifying an alternate next-hop selection to increase parental selection options.

19. A tangible, non-transitory, computer-readable media having software encoded thereon, the software a learning machine process, when executed by a processor, operable to:
determine a topological profile of individual nodes in the shared-media communication network;
determine a respective likelihood of the nodes in the network to become a root of a floating topology based on the topological profiles, wherein the floating topology is a sub-topology of a main topology that is likely to become disconnected from the main topology; and
send instructions to particular nodes in the network based on the respective likelihoods.

20. The computer-readable media as in claim 19, wherein the software when executed is further operable to:
determine a respective level of consequence of the nodes in the network becoming the root of the floating topology; and
send instructions to particular nodes in the network based on the respective levels of consequence.

21. The computer-readable media as in claim 19, wherein the provided instructions comprise one or more of: activating a keepalive exchange, modifying a routing topology to avoid indicated nodes, and modifying an alternate next-hop selection to increase parental selection options.

* * * * *